F. E. POSSON.
NUT LOCKING DEVICE.
APPLICATION FILED SEPT. 18, 1914.
1,181,248. Patented May 2, 1916.
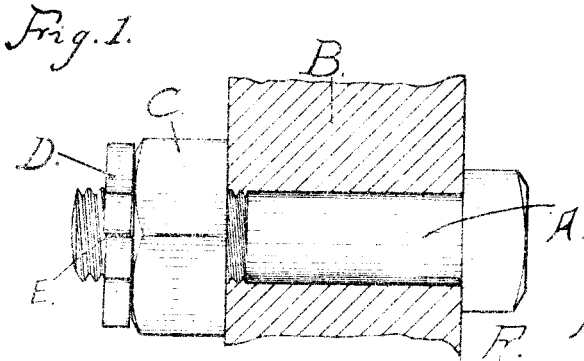
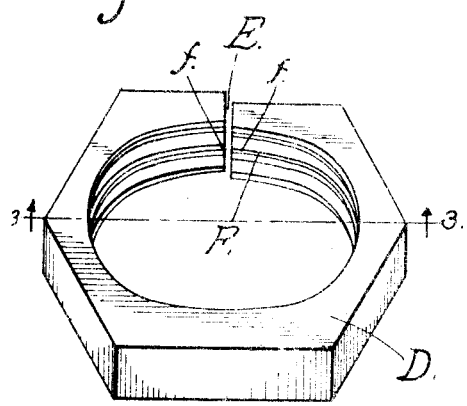
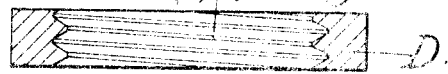
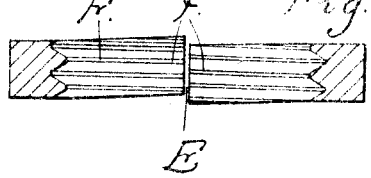
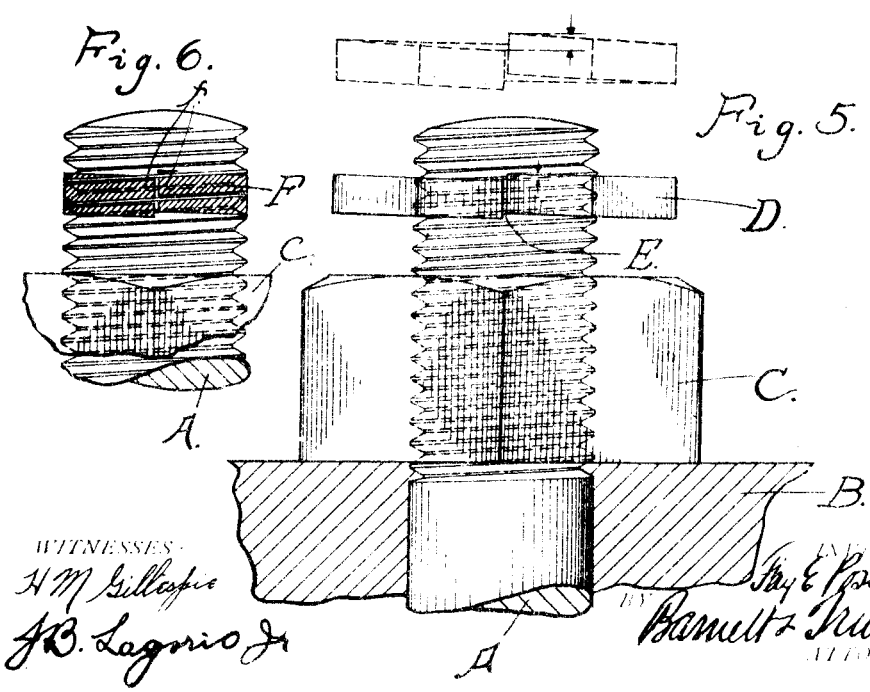
WITNESSES

UNITED STATES PATENT OFFICE.

FAY EDWARD POSSON, OF PARK RIDGE, ILLINOIS, ASSIGNOR TO SAFETY FIRST MANUFACTURING CO., OF CHICAGO, ILLINOIS, A CORPORATION OF ILLINOIS.

NUT-LOCKING DEVICE.

1,181,248. Specification of Letters Patent. Patented May 2, 1916.

Application filed September 18, 1914. Serial No. 862,340.

*To all whom it may concern:*

Be it known that I, FAY E. POSSON, a citizen of the United States, residing at Park Ridge, in the county of Cook and State of Illinois, have invented certain new and useful Improvements in Nut-Locking Devices, of which the following is a specification.

My invention relates to a nut locking device—that is to say, a device for holding a nut in place on its bolt; and the invention has for its principal object to provide a device of this sort which, by taking a firm frictional grip on the bolt, will prevent a nut on the bolt from being backed off by vibration or other like disturbing forces.

A further object is to provide a nut lock which can be made at little expense and may be very conveniently and expeditiously put in place on the bolt or removed therefrom when necessary.

The invention is illustrated, in a preferred embodiment, in the accompanying drawing in which—

Figure 1 is a side elevation of a bolt and nut and of a locking device constructed in accordance with the principles of my invention. Fig. 2 is a view, in perspective, of the locking device. Fig. 3 is a sectional view on line 3—3 of Fig. 2. Fig. 4 is a cross-sectional view of a nut from which the locking device is made according to the method of manufacture which I consider preferable. Fig. 5 is a view, in elevation, of a bolt with its nut, showing, in full lines, the nut locking device as applied to the bolt, and, in dotted lines, the device before being applied to the bolt; and Fig. 6 is a view of the bolt and locking device in position on the bolt showing a semi-circular section through the locking device at the root of the thread; the purpose of these figures being to illustrate the strain in the device produced by the engagement of its thread with the threading of the bolt.

Like characters of reference designate like parts in the several figures of the drawing.

Referring to the drawing, A designates a bolt which is shown as extending through a member or structure B, C a nut and D a nut locking device constructed in accordance with my invention. The latter is in fact a discontinuous nut which is made thin enough to be appreciably elastic, but of sufficient thickness to give it strength. Preferably, I take an ordinary thin nut $D^1$ (Fig. 4) and sever the same with a cut E from the perimeter of the nut through to its aperture. The threading of the nut, which preferably consists of a plurality of turns, as shown, has the same pitch as the threading of the bolt A. After severing the nut at E it is bent so that the portions thereof on opposite sides of the cut are offset from each other a trifle less than the distance between adjacent threads—that is, a distance a trifle less than the pitch of the bolt threading. The nut locking device thus formed may be screwed upon the bolt with a wrench in the same way that any ordinary nut would be applied. By bending the nut so that the portions on opposite sides of the cut E are offset, the spiral curvature of its threads in the direction parallel to the axis of the nut is greater than the corresponding curvature of the threading of the bolt. Therefore, when the device is screwed on to the bolt, it is strained or distorted from its normal shape as shown in Fig. 5; the pairs of small arrows in Fig. 5 indicating by comparison the amount of this strain. The strain in the locking device produces a binding stress between the threads of the nut and the threading of the bolt, which, if the offset between the ends of the threads on the nut is made to closely approximate the pitch distance, will be very considerable, particularly if the nut be made thick enough to have three or four threads, as shown. The amount of the offset—that is, the difference in the axial component of the spirals of the nut threads and that of the threading of the bolt—should not quite equal the distance between the turns of the threading on the bolt, or the locking device would cross-thread and could not be applied to the bolt. In other words, the discontinuous points on each thread of the locking device, for example, the ends $f$ of the middle thread F (Fig. 3) must stand in such relation to each other that they will follow along one after another in the same turn of the spiral channel of the bolt threading.

The application of the locking device of my invention to a bolt requires some force but is perfectly feasible by use of an ordinary wrench. Obviously, the device can be removed from the bolt in the same manner, The device is fundamentally different in its principle of construction from the familiar nut locks of the threaded, elastic type, which depend for their binding action upon engagement with the nut intended to be locked. These devices, which have been constructed in various ways, are screwed upon their bolts like an ordinary nut, without producing any stress between their threads and the threading of the bolts, greater than the normal friction between an ordinary nut and a bolt. The bind between the locking device and the bolt is produced only when the former is screwed down against the nut hard enough to draw the offset end of the locking device against the outer face of the nut. Any slight displacement of the locking device makes it as loose upon the bolt as an ordinary nut and, in fact, looser, as it necessarily is thinner than the standard nut with which it is used. A more important objection is that if the bolt stretches or if the nut embeds itself in the member or structure against which it is abutted, the nut is free to back away from the locking device, which thereby becomes loose on the bolt and will readily jar off the bolt. The difference between the nut locking device of my invention and nut locks of this type is that in my device the binding force between the locking device and the bolt is wholly independent of the nut, although it may be increased somewhat when the device is screwed firmly against the nut. The bind between the locking device and the bolt is dependent, primarily, on the stress created by the straining of the nut resulting from the difference in curvature between its threads and the threading of the bolt. Hence, the device will effectively prevent the nut from backing off the bolt, even should there be looseness between the bolt and the locking device due to the stretching of the bolt or the shrinkage or abrasion of the surface against which the bolt is intended to bear.

While the device of my invention has been shown and described as a nut locking device—that is, a device for holding an ordinary nut in place on its bolt, it will be obvious that the same principles of construction might be applied to the making of a self-locking nut, my device being in fact a self locking nut capable of use in place of an ordinary nut as well as with such nut for the purpose of keeping the same in place.

I claim:

1. The combination with a bolt of a locking nut formed with a thread of the same pitch as the thread of a bolt, severed with a cut which extends from the perimeter of the nut through to its aperture and from end to end thereof and having the portions thereof on opposite sides of the cut offset one from another a distance less than the distance between adjacent threads.

2. The combination with a bolt of a locking nut formed with a spiral thread, the inclination of which in respect to the axis of the nut is different throughout the nut from the corresponding inclination of the thread of the bolt, the ends of which thread in the nut stand in such relation to each other that in the application of the nut to the bolt one end of the thread follows the other in the same turn of the bolt threading.

3. The combination with a bolt of a locking nut formed with a plurality of discontinuous spiral threads, the inclination of which in respect to the axis of the nut is different throughout the nut from the corresponding inclination of the threading of the bolt, the ends of which threads in the nut stand in such relation to each other, in each case, that in the application of the nut to the bolt the ends of each thread follow each other in the same turn of the bolt threading.

4. The combination with a bolt of a discontinuous elastic nut, the threading of which throughout the nut has a configuration different from the configuration of the threading of the bolt, whereby the application of the nut to the bolt strains the former and produces a binding stress between the threadings of the bolt and nut.

5. As an article of manufacture, a nut internally threaded, severed by a cut extending from its aperture to its perimeter and throughout its length and bent to off-set the ends thus formed, said bend being substantially uniform throughout the body of the nut.

FAY EDWARD POSSON.

Witnesses:
L. A. FALKENBERG,
H. M. HUTCHINGS.